United States Patent [19]
Tokushige et al.

[11] Patent Number: 5,866,634
[45] Date of Patent: Feb. 2, 1999

[54] BIODEGRADABLE POLYMER COMPOSITIONS AND SHRINK FILMS

[75] Inventors: Yuji Tokushige; Makoto Ooura, both of Ibaraki-ken; Norio Nakamura, Tokyo; Shuhei Ueda, Ibaraki-ken, all of Japan

[73] Assignee: Shin-Etsu Chemical Co., Ltd, Tokyo, Japan

[21] Appl. No.: 703,995

[22] Filed: Aug. 28, 1996

[30] Foreign Application Priority Data

| Sep. 25, 1995 | [JP] | Japan | 7-245014 |
| Sep. 29, 1995 | [JP] | Japan | 7-253066 |
| Oct. 16, 1995 | [JP] | Japan | 7-267243 |
| Oct. 16, 1995 | [JP] | Japan | 7-267244 |

[51] Int. Cl.⁶ .......................... C08G 63/08; C08G 63/16; C08L 31/06; C08L 67/04
[52] U.S. Cl. .......................... 523/124; 525/186; 525/190; 525/437; 525/450; 525/411; 525/413; 525/415
[58] Field of Search .................... 523/124, 125; 525/186, 190, 437, 450, 411, 413, 415

[56] References Cited

U.S. PATENT DOCUMENTS

| 4,511,687 | 4/1985 | Nakanishi et al. | 525/190 |
| 5,051,476 | 9/1991 | Uji et al. | 525/186 |
| 5,216,043 | 6/1993 | Sipinen et al. | 523/125 |
| 5,320,624 | 6/1994 | Kaplan et al. | 525/415 |
| 5,475,063 | 12/1995 | Kaplan et al. | 525/415 |
| 5,484,881 | 1/1996 | Gruber et al. | 525/413 |
| 5,502,158 | 3/1996 | Sinclair et al. | 523/124 |
| 5,525,646 | 6/1996 | Lundgren et al. | 525/415 |
| 5,536,807 | 7/1996 | Gruber et al. | 525/415 |
| 5,585,191 | 12/1996 | Gruber et al. | 525/413 |

*Primary Examiner*—Peter A. Szekely
*Attorney, Agent, or Firm*—McAulay Nissen Goldberg Kiel & Hand, LLP

[57] ABSTRACT

The present invention provides a novel biodegradable polymer compositions effecting superiority in elongation at break, Izod impact strength and mold releasability which has not been obtained before the past and provides a biodegradable shrink film exceling in transparency, strength, flexibility, mold releasability and shrinkability by applying the biodegradable polymer composition to the shrink film. Thus, the biodegradable polymer compositions are provided which comprise as a main component a mixture of two or more of polylactic acids, glycol/aliphatic dicarboxylic acid copolymers and polycaprolactones and these biodegradable polymer compositions are applied to shrink films.

12 Claims, No Drawings

BIODEGRADABLE POLYMER COMPOSITIONS AND SHRINK FILMS

BACKGROUND OF THE INVENTION

1. Field of the Invention

The present invention relates to polymer compositions and shrink films having biodegradability. More particularly, the present invention relates to biodegradable polymer compositions and biodegradable shrink films which comprise polylactic acid mixed with another polyester type biodegradable polymer, can decompose substantially completely, and have improved physical properties.

2. Description of the Related Art

Most of conventional biodegradable polymer compositions comprise one kind of biodegradable polymer as a main component and further contain one or more additives such as plasticizers. Therefore, the physical properties are often governed by the main component polymer and some additives must be added in order to further improve the physical properties.

Hitherto, heat shrink films conventionally used for packaging and the like are mainly of polyvinyl chloride, polyethylene terephthalate or polystyrene type resins. However, shrink films made of such resins increase the amounts of refuse upon disposal and remain in the earth semipermanently when buried therein or affect the landscape adversely when left on the ground. Until now, no shrink film has been provided which decomposes under the natural environment. Thus, biodegradable polymers have recently attracted attention to solve these problems.

SUMMARY OF THE INVENTION

The present invention provides a novel biodegradable polymer composition effecting superior physical properties which has not been obtained, by mixing two or more of biodegradable polymers.

Further, the present invention provides a biodegradable shrink film having superiority in transparency, strength, flexibility, mold releasability and shrinkability by applying said biodegradable polymer composition to a shrink film.

The present inventors have keenly studied and, as a result, succeeded in developing a biodegradable polymer compositon having superior physical properties which comprises as a main component a composition comprising a mixture of two or more biodegradable polymers selected from the group consisting of polylactic acids, glycol/aliphatic dicarboxylic acid copolymers and polycaprolactones as well as optionally one or more selected from the group consisting of lubricant, plasticizer, ethylene/vinyl acetate copolymer (EVA) and thermal stabilizer.

The present inventors have also applied said biodegradable polymer composition to a shrink film and obtained a polylactic acid type biodegradable shrink film having superiority in transparency, strength, flexibility, mold releasability and shrinkability.

The polylactic acid used in the present invention may be obtained by condensation of L-lactic acid, D-lactic acid or a mixture thereof, preferably by ring opening polymerization of lactide which is a cyclic dimer of lactic acid. The lactide includes L-lactide which is a cyclic dimer of L-lactic acid, D-lactide which is a cyclic dimer of D-lactic acid, meso-lactide which is a cyclic dimer of D- and L-lactic acids, and DL-lactide which is a mixture of D- and L-lactides. The polylactic acid may be obtained by ring opening polymerization of one or more of these lactides. The ring opening polymerization of lactide is preferred since the lactide is easily polymerized and a product with a higher degree of polymerization may readily be obtained. The weight average molecular weight of the polylactic acid used in the present invention is not particularly limited but may usually be 30,000 to 1,000,000, preferably 100,000 to 300,000. Commercially available polylactic acids include ECOPLA™ by Cargill, Inc. and Lacty™ by Shimadzu Corp.

The glycol/aliphatic dicarboxylic acid copolymer used in the present invention may be aliphatic polyester synthesized by polycondensation of glycol and aliphatic dicarboxylic acid. The glycol may be represented by the formula:

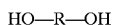

where R represents $(CH_2)_{2-6}$, $CH(CH_3)CH_2$, $(CH_2)_{10}$, $(CH_2)$ or the like.

The aliphatic dicarboxylic acid is represented by formula: $HOOC(CH_2)kCOOH$ wherein k has a value of 0 to 8. If k is 9 or higher, the reactivity decreases and the polymerization would be difficult to carry out. The molecular weight of the aliphatic polyester synthesized by polycondensation of glycol and aliphatic dicarboxylic acid is not particularly limited but preferably in the range of 50,000 to 300,000. The content of glycol is 20 to 70% by weight and the content of aliphatic dicarboxylic acid is 30 to 80% by weight. Preferably, the glycol content is 30 to 60% by weight and the aliphatic dicarboxylic acid content is 40 to 70% by weight. If the glycol content is less than 20% by weight, the biodegradability will decrease. If the glycol content exceeds 70% by weight, the physical strength will be reduced. Commercially available glycol/aliphatic dicarboxylic acid may include BIONOLE™ by Showa High Polymer Co., Ltd.

The polycaprolactone used in the present invention is a crystalline thermoplastic represented by the general formula:

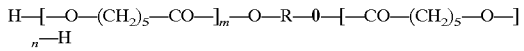

wherein R represents carbonyl group CO or $(CH_2)_p$, and wherein m is in the range of 0 to 800, preferably 200 to 500, n is in the range of 0 to 800, preferably 0 to 300, and p is in the range of 0 to 20, preferably 0 to 10. More preferably, the sum of m, n and p, i.e., (m+n+p) is in the range of 300 to 800. The weight average molecular weight is not particularly limited but preferably in the range of 10,000 to 100,000. Commercially available polycaprolactone may include PLAQUCEL™ by Daicel Chemical Industries, Ltd.

When two of biodegradable polymers, polylactic acid and glycol/aliphatic dicarboxylic acid copolymer, are used as a mixture, these polymers are formulated at a weight ratio in the range of 1/99 to 99/1. A preferred ratio is 60/40 to 90/10. If necessary, one or more selected from the group consisting of lubricant, plasticizer, ethylene vinylacetate copolymer (EVA) and thermal stabilizer may be added. When two of biodegradable polymers, polylactic acid and polycaprolactone, are used as a mixture, these polymers are formulated at a weight ratio in the range of 1/99 to 99/1, preferably 60/40 to 90/10. If necessary, one or more selected from the group consisting of lubricant, plasticizer, EVA and thermal stabilizer may be added.

When two of biodegradable polymers, glycol/aliphatic. dicarboxylic acid copolymer and polycaprolactone, are used as a mixture, these polymers are formulated at a weight ratio in the range of 20/80 to 80/20, preferably 40/60 to 60/40. If necessary, one or more selected from the group consisting of lubricant, plasticizer, EVA and thermal stabilizer may be added.

When three of biodegradable polymers, polylactic acid, glycol/aliphatic dicarboxylic acid copolymer and polycaprolactone, are used as a mixture, the weight ratio of the glycol/aliphatic acid copolymer to the polycaprolactone is in the range of 30/70 to 70/30,while the weight ratio of the polylactic acid to the polycaprolactone is in the range of 20/80 to 80/20. Further, one or more selected from the group consisting of lubricant, plasticizer, EVA and thermal stabilizer may be added, if necessary.

Among the above mentioned compositions of the present invention, those biodegradable polymer compositions wherein at least one polymer polylactic acid are more preferred herein. With respect to the application of the present invention to shrink films, also more preferred are those biodegradable polymer compositions containing at least polylactic acid.

Futher, it is preferred to mix and use two of biodegradable polymers, polylactic acid and glycol/aliphatic dicarboxylic acid copolymer. When applied to shrink films, the shrink curve has relatively smaller inclination as compared with that of polylactic acid itself. Accordingly, wrinkle can be prevented from occurring upon shrinkage when the shrink film is allowed to shrink on a container.

The lubricant used in the present invention may be any of lubricants used conventionally. For example, one or more of fatty acid esters, hydrocarbon resins, paraffins, higher fatty acids, hydroxy-fatty acids, fatty acid amides, alkylene bis-fatty acid amides, aliphatic ketones, lower alcohol esters of fatty acids, polyhydric alcohol esters of fatty acids, polyglycol esters of fatty acids, fatty alcohols, polyhydric alcohols, polyglycols, polyglycerols, metal soaps, and modified silicones may be used. Preferably, fatty acid esters or hydrocarbon resins may be used. The lubricant is added in an amount of 0.05 to 5 parts by weight, preferably 0.1 to 3 parts, against 100 parts by weight of the polylactic acid. With less than 0.05 parts by weight, the effect thereof is insufficient. If the amount exceeds 5 parts by weight, the resulting film can not wind around a roll and its physical properties will decrease. Commercially available products thereof include RIKESUTAT™ EW-100 from Riken Vitamin Co., Ltd. and Hoechst Wax OP from Hoechst AG.

The plasticizer used in the present invention may include aliphatic dibasic acid esters, phthalic acid esters, hydroxy polybasic carboxylic acid esters, polyester type plasticizers, fatty acid esters and epoxy plasticizers. For example, the phthalic acid esters such as di-2-ethylhexyl phthalate (DOP), dibutryl phthalate (DBP) and diisodecyl phthalate (DIPP); adipic acid esters such as di-2-ethylhexyl adipate (DOA) and diisodecyl adipate (DIDA); azelaic acid esters such as di-2-ethylhexyl azelate (DOZ); hydroxy polyvalent carboxylic acid esters such as tri-2-ethylhexyl acetylcitrate and tributyl acetylcitrate; and polyester plasticizers such as polypropylene glycol adipic acid esters. One or more of the above may be used as plasticizer. Preferably, di-2-ethylhexyl azelate (DOZ) is used. The plasticizer is preferably used in the range of 3 to 30 parts by weight, more preferably 5 to 15 parts by weight, against 100 parts by weight of the biodegradable polymer. If less than 3 part by weight, the elongation at break and impact strength will decrease. If it exceeds 30 parts by weight, the break strength and impact strength will be reduced.

The ethylene vinyl acetate copolymer (EVA) used in the present invention has ethylene content of 10 to 70% by weight and vinyl acetate content of 30 to 90% by weight, preferably ethylene content of 20 to 40% by weight and vinyl acetate content of 60 to 80% by weight. If the vinyl acetate content is lower than 30% by weight, the elongation at break will be low. If the vinyl acetate content is above 90% by weight, the Izod impact value will be low. The EVA desirably has a weight average molecular weight of 50,000 to 500,000. If the molecular weight is lower than 50,000, the break strength and yield strength as well as elongation at break will be low. If it exceeds 500,000, the break strength will decrease. The EVA is added in an amount of 5 to 70 parts by weight, preferably 10 to 30 parts by weight, against 100 parts by weight of the biodegradable polymer. If EVA is less than 5 parts by weight, satisfactory elongation at break or impact strength can not be obtained. If EVA exceeds 70 parts by weight, the present composition will effect reduced transparency and strength. Commercially available EVA includes EVATHLENE™ 250, 310P and 450P from Dainippon Ink & Chemicals, Inc.

It is preferable to add EVA when the present invention is applied to heat shrink films, since the shrinkability at lower temperatures is improved (i.e., it excels in shrinkability at low temperature).

The thermal stabilizer used in the present invention may be inorganic salt of lactic acid and include, for example, sodium, calcium, aluminum, barium, magnesium, manganese, iron, zinc, lead, silver and copper lactate. One or more of these salts may be used. The amount thereof added is 0.5 to 10 parts by weight, preferably 0.5 to 5 parts by weight, against 100 parts by weight of the biodegradable polymer. The thermal stabilizer used in this range tends to improve the impact strength (Izod impact) and to reduce the scattering of the values for elongation at break, break strength and impact strength.

The present invention provides a biodegradable polymer composition comprising as a main component a mixture of two or more of polylactic acid, glycol/aliphatic dicarboxylic acid copolymer and polycaprolactone and optionally one or more selected from the group consisting of lubricant, plasticizer, EVA and thermal stabilizer. If necessary, a colorant may be added.

As seen from Table 1,polylactic acid biodegradable polymer composition has been developed which effects superiority in elongation at break, Izod impact strength and mold releasability. Further, by applying this to a shrink film, there has been developed a polylactic acid biodegradable shrink film having excellent elongation at break, Izod impact strength, mold releasability, transparency and heat shrinkability. The present shrink film is excellent in printability and can be used as a shrink film for labelling. When it is used as a film, it can be applied to various uses such as packaging materials. In addition, the composition effecting the flexibility is used in bottles, containers or vessels for detergents and cosmetics, in fibers, and in tablewares for first foods.

DETAILED DESCRIPTION OF PREFERRED EMBODIMENTS

The present invention will be described by way of the following Examples 1 to 10 and Comparative Example 1.

Polylactic acid (ECOPLA™ by Cargill, Inc.), glycol/aliphatic dicarboxylic acid copolymer (BIONOLE™ ##1010 by Showa High Polymer Co., Ltd.), polycaprolactone (PLAQUCEL™ by Daicel Chemical Industries, Ltd.), fatty acid ester (RIKESUTA™ EW-100 by Riken Vitamin Co., Ltd.) and modified silicone oil (KF-410 by Shin-Etsu Chemical Co., Ltd.) as lubricants, di-2-ethylhexyl azelate (DOZ) (New Japan Chemical Co., Ltd.) as plasticizer, EVA (EVATHLENE™ by Dainippon Ink & Chemicals, Inc.), and thermal stabilizer sodium lactate purchased from WAKO Pure Chemical Industries, Ltd. were blended in proportions shown in Table 1. The resulting blend was kneaded with a 6 inch roll at 140° C. for 10 minutes to yield a molded sheet of about 1 mm in thickness.

Specimens and films were prepared from the resulting molded sheet and subjected to the mold release, tensile and impact tests by the following methods. The results are shown in Table 1.

Mold releasability: Peelability from a roll was evaluated when the above mentioned molded sheet of about 1 mm in thickness was removed from the 6 inch roll. The criteria are as shown below.

A: very easy to peel;

B: easy to peel;

C: slightly difficult to peel;

D: difficult to peel.

Tensile test: The resulting molded roll sheet was cut and press molded at 160° C under an actual pressure of 50 kgf/cm$^2$ for 8 minutes to prepare plane plate specimens of 1 mm in thickness for tensile test. The specimens were subjected to the tensile test according to Japanese Industrial Standard (JIS) K-7113.

Izod impact test: The resulting molded roll sheet was cut and four cut samples were superimposed and press molded at 160° C. under an actual pressure of 50 kgf/cm$^2$ for 10 minutes to prepare plane plate specimens of 3 mm in thickness for Izod impact test. The specimens were subjected to the Izod impact test according to JIS K-7110.

content of 40% by weight and aliphatic dicarboxylic acid content of 60% by weight; weight average molecular weight 69,300;

Polycaprolactone: in Examples 1 and 4, PLAQUCEL™ H4 manufactured by Daicel Chemical Industries, Ltd., weight average molecular weight 45,200;in Examples 5 and 6, PLAQUCEL™ manufactured by Daicel Chemical Industries, Ltd., weight average molecular weight 52,400;and in Examples 7 and 9,PLAQUCEL™ manufactured by Daicel Chemical Industries, Ltd., weight average molecular weight 48,000;

Lubricant: RIKESUTA™ EW-100 (fatty acid ester, manufactured by Riken Vitamin Co., Ltd.);

EVA: in Examples 1 and 3, EVATHLENE™ 450P manufactured by Dainippon Ink & Chemicals, Inc., ethylene content of 20% by weight and vinyl acetate content of 80% by weight, weight average molecular weight 248,000;in Example 6, EVATHLENE™250 manufactured by Dainippon Ink & Chemicals, Inc., ethylene content of 20% by weight and vinyl acetate content of 80% by weight, weight average molecular weight 245,000;and in Examples 8 and 9,EVATHLENE™ manufactured by Dainippon Ink & Chemicals, Inc., ethylene content of 20% by weight and vinyl acetate content of 80% by weight, weight average molecular weight 256,000;

Plasticizer: DOZ manufactured by New Japan Chemical Co., Ltd.;

Thermal stabilizer: Sodium lactate purchased from WAKO Pure Chemical Industries, Ltd.; and Mold release agent: Modified silicone oil KF-410 manufactured by Shin-Etsu Chemical Co., Ltd.

TABLE 1

| | | Ex. 1 | Ex. 2 | Ex. 3 | Ex. 4 | Ex. 5 | Ex. 6 | Ex. 7 | Ex. 8 | Ex. 9 | Ex. 10 | Comp. Ex. 1 |
|---|---|---|---|---|---|---|---|---|---|---|---|---|
| Formulated composition (parts by weight) | Polylactic acid | 100 | 100 | 100 | 100 | 100 | 100 | 100 | 100 | 100 | 100 | 100 |
| | BIONOLE ™ #1010 | 20 | 40 | 20 | 20 | 0 | 0 | 20 | 30 | 30 | 40 | 0 |
| | Polycaprolactone | 20 | 0 | 0 | 20 | 40 | 40 | 20 | 0 | 20 | 0 | 0 |
| | RIKESUTA ™ EW-100 | 1 | 1 | 0 | 1 | 0 | 1 | 0 | 0 | 0 | 0 | 0 |
| | DOZ | 0 | 0 | 10 | 0 | 0 | 0 | 0 | 0 | 0 | 0 | 0 |
| | EVA | 20 | 0 | 20 | 0 | 0 | 20 | 0 | 30 | 20 | 0 | 0 |
| | Sodium lactate | 0 | 0 | 2 | 0 | 0 | 0 | 0 | 0 | 0 | 0 | 0 |
| | KF-410 | 0 | 0 | 1 | 0 | 0 | 0 | 0 | 0 | 0 | 0 | 0 |
| Mold releasability | | A | A | B | A | C | A | C | C | C | C | D |
| Tensile strength | Yield strength (kgf/mm$^2$) | 4.5 | 4.5 | 4.2 | 3.8 | 3.15 | 3.02 | 3.8 | 2.8 | 4.6 | 4.5 | 4.3 |
| | Break strength (kgf/mm$^2$) | 3.6 | 3.2 | 3.1 | 3.2 | 2.73 | 2.85 | 3.2 | 2.7 | 3.6 | 3.2 | 4.1 |
| | Elongation at break (%) | 115 | 96 | 110 | 84 | 61 | 129 | 84 | 135 | 120 | 93 | 4.4 |
| Izod impact strength (kgf.cm/cm$^2$) | | 50 | 8 | 42 | 12 | 11 | 33 | 13 | 80 | 52 | 10 | 2.3 |

Polylactic acid: ECOPLA ™ manufactured by Cargill, Inc., weight average molecular weight 168,300;
Glycol/aliphatic dicarboxylic acid copolymer: BIONOLE ™ manufactured Showa High Polymer Co., Ltd; glycol content of 40% by weight and aliphatic dicarboxylic acid content of 60% by weight; weight average molecular weight 69,300;
Polycaprolactone: in Examples 1 and 4, PLAQUCEL ™ H4 manufactured by Daicel Chemical Industries, Ltd., weight average molecular weight 45,200; in Examples 5 and 6, PLAQUCEL ™ manufactured by Daicel Chemical Industries, Ltd., weight average molecular weight 52,400; and in Examples 7 and 9, PLAQUCEL ™ manufactured by Daicel Chemical Industries, Ltd., weight average molecular weight 48,000;
Lubricant: RIKESUTA ™ EW-100 (fatty acid ester, manufactured by Riken Vitamin Co., Ltd.);
EVA: in Examples 1 and 3, EVATHLENE ™ 450P manufactured by Dainippon Ink & Chemicals, Inc., ethylene content of 20% by weight and vinyl acetate content of 80% by weight, weight average molecular weight 248,000; in Example 6, EVATHLENE ™ 250 manufactured by Dainippon Ink & Chemicals, Inc., ethylene content of 20% by weight and vinyl acetate content of 80% by weight, weight average molecular weight 245,000; and in Examples 8 and 9, EVATHLENE ™ manufactured by Dainippon Ink & Chemicals, Inc., ethylene content of 20% by weight and vinyl acetate content of 80% by weight, weight average molecular weight 256,000;
Plasticizer: DOZ manufactured by New Japan Chemical Co., Ltd.;
Thermal stabilizer: Sodium lactate purchased from WAKO Pure Chemical Industries, Ltd.; and
Mold release agent: Modified silicone oil KF-410 manufactured by Shin-Etsu Chemical Co., Ltd.

Polylactic acid: ECOPLA™ manufactured by Cargill, Inc., weight average molecular weight 168,300;

Glycol/aliphatic dicarboxylic acid copolymer: BIONOLE™ manufactured Showa High Polymer Co., Ltd; glycol Further, the roll sheets obtained in Examples 2 and 8 and Comparative Example 1 were subjected to the following thermal shrink test. The results are shown in Table 2.

Thermal shrink test: The roll sheets obtained in Examples 2 and 8 and Comparative Example 1 were cut and press molded at 150° C under an actual pressure of 50 kgf/cm² for 8 minutes to prepare a film of 0.15 mm in thickness for shrink test, which was then cut into rectangles of 5 cm ×10 cm. The film was stretched three times in the longitudinal direction at 65° C. at a stretching rate of 20 cm/min with a stretching machine. The resulting stretched film was cut to prepare specimens of 45 mm ×100 mm for thermal shrink test. The resulting stretched film as a sample for thermal shrink testing was placed between wire gauzes and dipped in a thermostatic water bath preset at any one of 45° C., 50° C., 55° C., 60° C., 65° C., 80° C. or 85° C for 30 seconds. Then, the longitudinal dimension of the specimen was measured to calculate the percent shrinkage according to the following equation:

$$\text{Percent shrinkage } (\%) = [L_0 - L]/L_0 \times 100$$

wherein $L_0$ is a longitudinal length of a specimen for thermal shrinkage testing (100 mm) and L is a longitudinal length (mm) of the specimen after dipped into hot water at a give temperature for 30 seconds.

TABLE 2

|  | Shrinkage at 45° C. | Shrinkage at 50° C. | Shrinkage at 55° C. | Shrinkage at 60° C. | Shrinkage at 65° C. | Shrinkage at 80° C. | Shrinkage at 85° C. |
| --- | --- | --- | --- | --- | --- | --- | --- |
| Comp. Ex. 1 | 0% | 6% | 65% | 67% | 67% | 67% | 67% |
| Ex. 8 | 0% | 10% | 36% | 44% | 48% | 54% | 54% |
| Ex. 2 | 0% | 4% | 21% | 32% | 44% | 52% | 52% |

We claim:

1. A biodegradable polymer composition comprising as a main component a mixture of two or more compounds selected from the group consisting of polylactic acid, glycol/ aliphatic dicarboxylic acid copolymer, and polycaprolactone, wherein said mixture contains polylactic acid and glycol/aliphatic dicarboxylic acid copolymer having a weight ratio of a polylactic acid content to a glycol/ aliphatic dicarboxylic acid content in the range of 60/40 to 90/10, and 5 to 70 weight parts of ethylene vinyl acetate copolymer are added to 100 parts of said biodegradable composition, wherein the ethylene vinyl acetate has an ethylene content of 10 to 70% and a vinyl acetate content of 30 to 90%, a weight average molecular weight from 50,000 to 500,000 and wherein the glycol/aliphatic dicarboxylic acid has a glycol content from 20 to 70%, a dicarboxylic acid content of 30 to 80%, and the dicarboxylic acid contains no more than 10 carbon atoms.

2. The biodegradable polymer composition according to claim 1, which further comprises one or more additives selected from the group consisting of a lubricant, a plasticizer and a thermal stabilizer.

3. The biodegradable polymer composition according to claim 2, wherein said plasticizer is selected from the group consisting of aliphatic dibasic acid ester, phthalic acid ester, hydroxy polybasic carboxylic acid ester, polyester plasticizer, fatty acid ester, and epoxy plasticizer.

4. The biodegradable polymer composition according to claim 5, wherein said thermal stabilizer is an inorganic salt of lactic acid.

5. A biodegradable shrink film comprising a biodegradable polymer composition according to claim 2.

6. The biodegradable polymer composition according to claim 1 wherein the amount of ethylene vinyl acetate copolymer is 10 to 30 weight parts.

7. The biodegradable polymer composition according to claim 1 wherein said glycol/aliphatic dicarboxylic acid copolymer has a glycol content of 20 to 70% by weight and an aliphatic dicarboxylic acid content of 30 to 80% by weight.

8. A biogradable shrink film comprising a biogradable polymer composition according to claim 6.

9. A biodegradable shrink film comprising a biodegradable polymer composition according to claim 6.

10. A biodegradable shrink film comprising a biodegradable polymer composition according to claim 7.

11. The biodegradable polymer composition according to claim 2, wherein said lubricant is selected from the group consisting of paraffin, hydrocarbon resin, higher fatty acid, hydroxy-fatty acid, fatty acid amide, alkylene bis-fatty acid amide, fatty acid ester, aliphatic ketone, polyglycol ester of fatty acid, fatty alcohol, polyhydric alcohol, polyglycol, polyglycerol, modified silicone, and metal soap.

12. The biodegradable polymer composition according to claim 2, wherein said lubricant is selected from the group consisting of paraffin, hydrocarbon resin, palmitic acid, stearic acid, oleic acid, linoleic acid, linolenic acid, hydroxy-fatty acid, fatty acid amide, alkylene bis-fatty acid amide, fatty acid ester, aliphatic ketone, polyglycol ester of fatty acid, fatty alcohol, polyhydric alcohol, polyglycol, polyglycerol, modified silicone, and metal soap.

* * * * *